United States Patent [19]
Ruck

[11] 3,866,244

[45] Feb. 18, 1975

[54] HEADGEAR STRUCTURE FOR WELDING HELMETS AND THE LIKE

[75] Inventor: Heinz E. Ruck, Morton, Pa.

[73] Assignee: The Fibre-Metal Products Co., Concordville, Pa.

[22] Filed: Nov. 8, 1973

[21] Appl. No.: 414,165

[52] U.S. Cl. .................................................. 2/8, 2/3 C
[51] Int. Cl. .......................... A61f 9/00, A41d 13/00
[58] Field of Search ......................................... 2/8, 3

[56] References Cited
UNITED STATES PATENTS

| | | | |
|---|---|---|---|
| 2,167,969 | 8/1939 | Bowers | 2/8 |
| 2,328,042 | 8/1943 | Welsh | 2/8 |
| 3,060,444 | 10/1962 | Hoffmaster et al. | 2/8 |
| 3,156,922 | 11/1964 | Anderson | 2/3 R |
| 3,156,923 | 11/1964 | Timm | 2/3 R |

*Primary Examiner*—Werner H. Schroeder

[57] ABSTRACT

A headgear structure including a headband and head-bridging element between spaced regions of the band for extension over a wearer's head, and a pair of looped extensions on opposite sides of the headband outwardly thereof and connected to the bridge piece, the looped extensions having their outer portions provided with pivot means for rotatively mounting a welding helmet.

8 Claims, 6 Drawing Figures

PATENTED FEB 18 1975 3,866,244
SHEET 1 OF 2
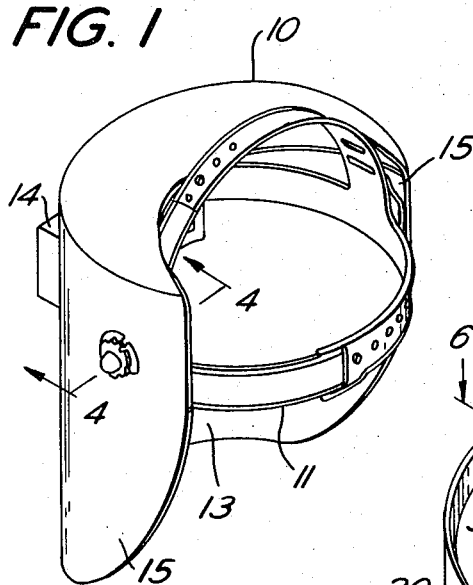
FIG. 1
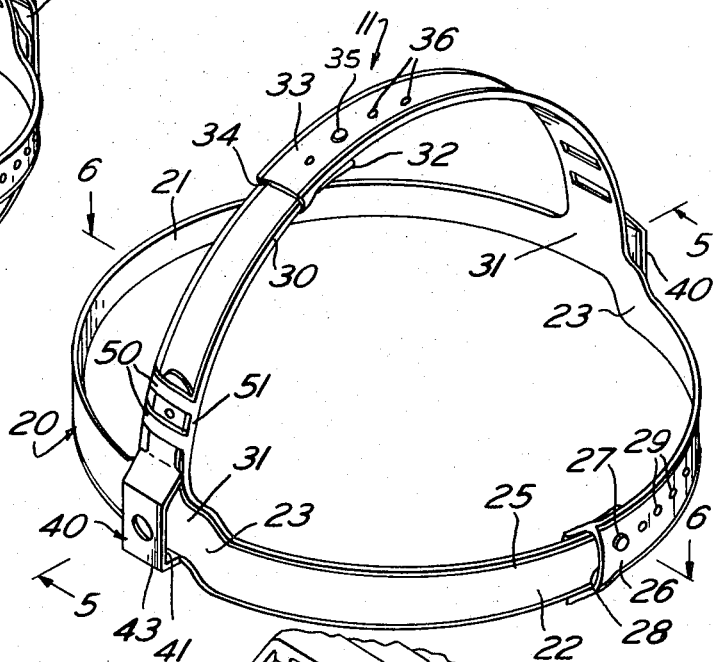
FIG. 2
FIG. 4
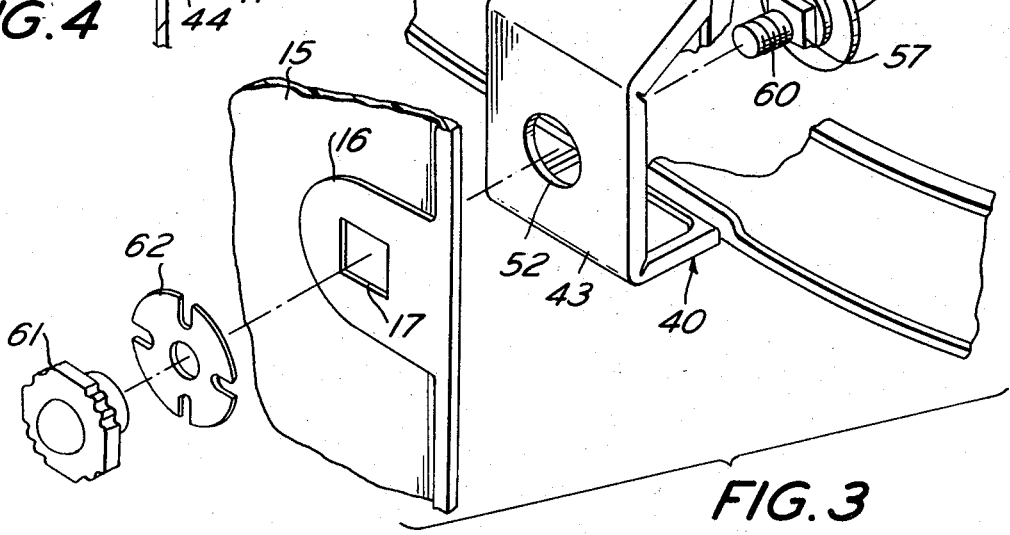
FIG. 3

HEADGEAR STRUCTURE FOR WELDING HELMETS AND THE LIKE

BACKGROUND OF THE INVENTION

While in the past there have been a variety of welding helmets, and headgear structures for supporting the same, these prior devices have been subject to certain problems, including that of tedious and difficult assembly of many component parts, requiring excessive space in storage and shipment, often involving rivets and other metallic elements imparting certain hazards, and also being subject to falling against a wearer's head, or bottoming-out when the wearer's head is turned on its side, as in overhead welding and other manipulations.

SUMMARY OF THE INVENTION

It is, therefore, an important object of the present invention to provide a headgear structure in the nature of a cradle or suspension, which overcomes the above-mentioned prior art difficulties, is capable of being integrally fabricated of a single piece of plastic, say by conventional molding procedures, to afford substantial economies in manufacture, which is capable of a storage or nonuse condition lying substantially flat to save considerable space in transit and storage while permitting of quick and easy assembly with a welding helmet, or the like, by the user in the field.

It is another object of the present invention to provide a headgear structure for welding helmets, and the like, of the type described wherein the use of metallic or other hard, metal components is substantially eliminated to obviate the electrical and mechanical hazards thereof while affording ample dielectric and mechanical strength.

It is still a further object of the present invention to provide a headgear structure having a advantageous characteristics mentioned in the preceding paragraphs, wherein a helmet is effectively maintained in properly spaced relation with respect to the wearer's head in all conditions of use, including those assumed in overhead welding, and the like, to eliminate the problems of bottoming-out and excessive localized pressure on the wearer.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top rear perspective view showing a headgear structure of the present invention in operative association with a welding helmet.

FIG. 2 is a top rear perspective view similar to FIG. 1, but showing the headgear structure apart from the welding helmet.

FIG. 3 is a fragmentary, exploded perspective view illustrating the manner of pivotally joining the instant headgear structure with a welding helmet.

FIG. 4 is a partial sectional elevational view taken generally along the line 4—4 of FIG. 1.

DESCRIPTION OF THE PREFERRED EMBODIMENT

Figure 5:
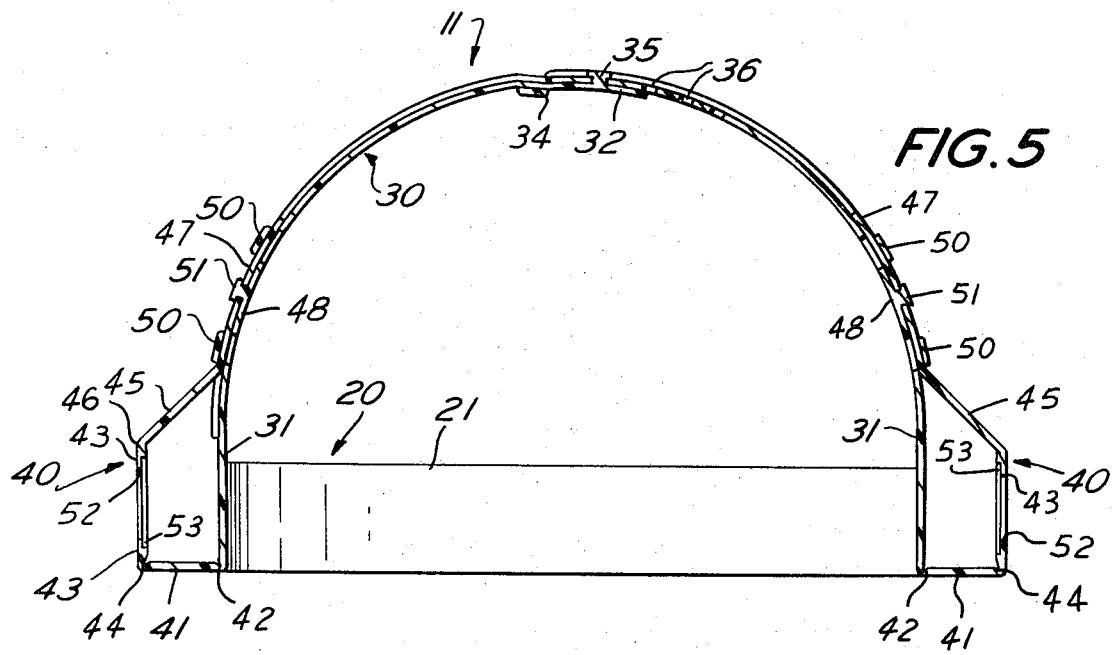
FIG. 5 is a sectional elevational view taken generally along the line 5—5 of FIG. 2.
Figure 6:
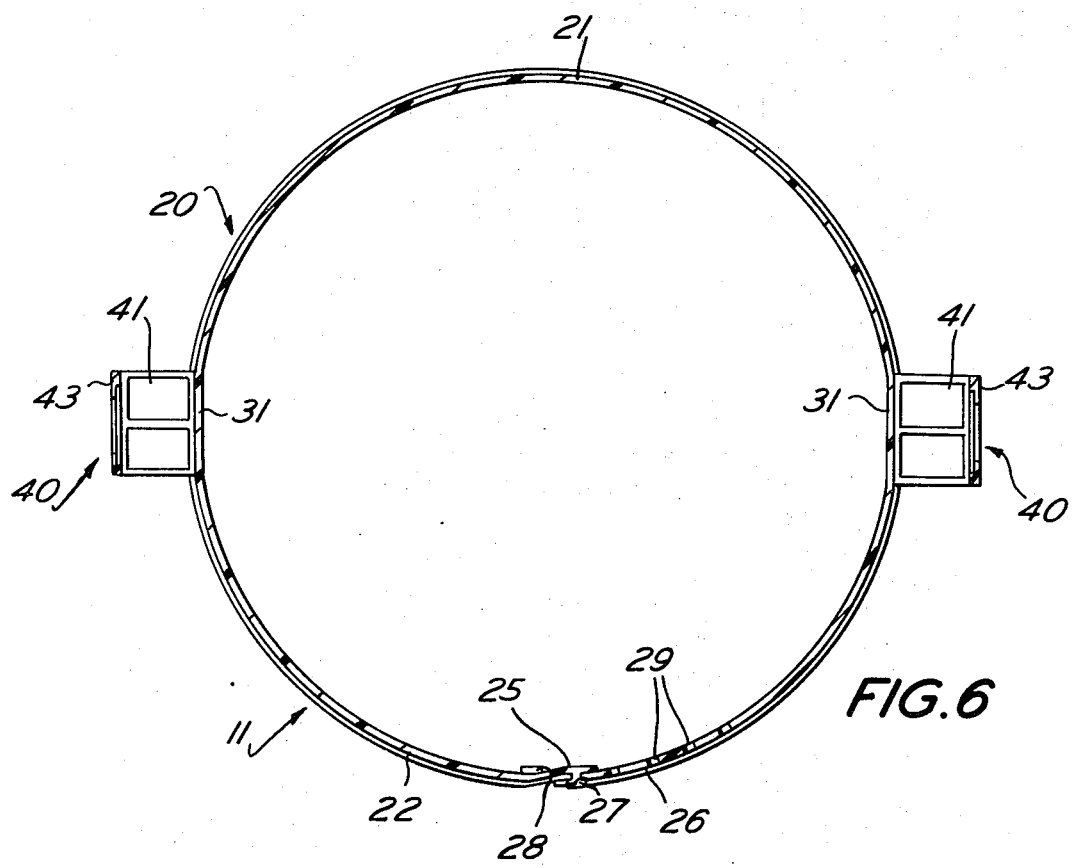
FIG. 6 is a horizontal sectional view taken generally along the line 6—6 of FIG. 2.

Referring now more particularly to the drawings, and specifically to FIG. 1 thereof, there is illustrated therein a welding helmet assembly including a head shielding shell 10, and located generally interiorly thereof a shell or helmet supporting headgear, suspension or cradle structure 11. The helmet shell 10 may be generally conventional, including a front, face covering portion 13 having a suitable window 14 and extending rearwardly on opposite sides to define side portions or walls 15. As best seen in FIG. 3, each helmet side wall 15 may be formed with a thickened portion or boss 16 having a through opening 17, advantageously of noncircular configuration, such as the polygonal configuration illustrated.

Referring now to FIG. 2, there is seen the headgear structure 11, which may be entirely integrally fabricated, say of plastic, as by conventional molding procedures, in practice, high density polyethylene has been found satisfactory, affording the desired flexibility, resilience and stiffness, as well as dielectric characteristics.

The headgear structure 11 may include an annular headband 20 for circumposition about the wearer's head, with a forward headband part 21 extending across the front of the head, and a rearward headband part 22 extending across the rear of the wearer's head. The rearward headband part 22 is offset downwardly with respect to the forward headband part 21, as by downwardly offsetting headband portions 23 located on opposite sides of the headband. The headband 20 may be considered as split, being defined by a single elongate strip having its end portions 25 and 26 extending into overlapping relation. The end portion 25 may be formed with an integral securement element of fastener part 27, say a protuberance, lug or headed boss 27. The other end portion 26 may be transversely slotted, as at 28 for receiving the end portion 25, and formed with a series of through apertures or holes 29 at longitudinally spaced locations along the end portion 26. Thus, in the setup condition of FIG. 2, it is seen that the end portion 25 is insertable through the slot 28 a selected distance to provide a desired circumference of headband 20, and the fastener element 27 is snapped through the adjacent complementary fastener element or hole 29. upon disengagement or disconnection between end portions 25 and 26, the entire headband 21 may be extended to lie flat.

The headgear 11 further includes an overhead member, dome or bridge piece 30, extending in bridging relation between spaced opposed side portions 31 of the headband 20, each portion 31 being located adjacent to and just forwardly of a respective offsetting headband portion 23. The overhead or bridge piece 30 may also be split, as having detachably connected overlapping end portions 32 and 33, the former being innermost or beneath the latter. More specifically, the upper or outer bridge piece end portion 33 may be formed with a transverse through slot 34 slidably receiving the other end portion 32; and the latter may be provided with a headed lug or fastener element 35 snap engageable through a selected fastener element or hole 36 formed in the end portion 33. That is, a series of fastener elements or holes 36 complementary to the fastener element or lug 35 may be arranged longitudinally along the end portion 33 for selective snap engagement therethrough of the lug. In this manner, the length of the overhead member or bridge piece 30 may be selectively adjusted for suitable conforming engagement with the wearer's head.

In addition, a pair of mounting loops 40 are provided exteriorly or opposed spaced side regions 31 of the headband 20. The mounting loops 40 may each include a lower, outstanding portion 41 projecting from a lower region of the adjacent headband portion 31 and hingedly connected thereto, as by a flexible hinged connection 42. Additionally, an upstanding portion 43 is hingedly connected, as by a flexible connecting portion 44, to the outer extremity of outstanding portion 41, and upstands therefrom in outwardly spaced, facing relation with respect to the headband portion 31. Further, an inwardly extending portion 45 extends obliquely inwardly and upwardly from the upper extremity of the upstanding portion 43, being hingedly connected to the latter, as by flexible connecting portion 46. From the inwardly extending portion 45, remote from its hinged connection 46, there extends an end portion 47 detachably secured in facing engagement with an adjacent region 48 of bridge piece 30.

Thus, it will now be apparent that each looped member 40 is defined by an elongate extension composed of hinged connection 42, outstanding portion 41, hinged connection 44, upstanding portion 43, hinged connection 46, inwardly extending portion 45 and end portion 47. The looped extensions 40 are each formed integral with the headband 20, extending from the lower extremities of respective headband portions 31. The bridge piece 30, as by its split end portions 32 and 33, is also integral with the headband 20, each end portion extending integrally from the upper edge region of a respective headband portion 31.

The regions 48 of overhead member or bridge piece 30 adjacent to headband regions 31 are each provided with strap receiving portions or loops 50, and a fastener element or lug 51 projects outwardly from the bridge piece portion 48 for snap engagement in a complementary fastener element or aperture 52 formed in the looped extension and portion 47. Additionally, the looped extension upstanding portion 43 may be formed centrally with a through aperture, say a circular hole 52, which hole may be located in a circular recess 53 facing inwardly toward headband portion 31, for a purpose appearing presently.

In a nonuse or storage condition, as with the headband end portions 25 and 26 disconnected and the headband opened to a flat or planar relation, the bridge piece or overhead member 30 may have its end portions 32 and 33 disconnected and extending in flat relation, generally coplanar with the flat headband 20. Further, the looped extensions 40 may each have its end portion 47 disconnected from the adjacent region 48 of bridge piece 30, and swung about its hinged connections to extend in a flat relation coplanar with each other and with the flat headband 20 and flat bridge member 30. Obviously, this nonuse condition effects considerable savings in space, as for economy in storage and transit. Also, the single piece, integral formation of headgear hereinbefore described may be economically molded in a relatively inexpensive, flat mold.

In FIG. 4 it will be seen that the helmet shell 10 is carried by the headgear 11, being pivotally connected to the latter by pivot means 55 connecting the shell side wall 15 pivotally to the outer, upstanding portion 43 of the looped extension 43.

More specifically, the pivot means 55 includes an inner threaded member 56 which may include a polygonal portion 57 for conforming, nonrotative engagement in the noncircular shell hole 17.

The threaded pivot element 56 is further formed with a generally circular bearing portion 58 rotatably conformably received in circular aperture or hole 52 of the adjacent looped extension upstanding portion 43. Additionally, there is provided an enlarged generally circular head 59 on the threaded member 56 rotatably received in the recess 53 and retaining the threaded member 56 from outward withdrawal. In this manner, the helmet or shell 10 is rotatably mounted with respect to the headgear 20, the threaded element 56 being nonrotatable with the shell and rotatable relative to the associated looped extension 40.

The threaded member 56 may be a male element having an outwardly projecting threaded shank or screw 60, and an internally threaded female element, finger nut or knob 61 is located exteriorly of the helmet shell 10 and threadedly interengaged with the threaded shank 60. Further, a nonplanar or cupped resilient element or Belleville type spring 62 is circumposed about the threaded shank 60 and interposed between the boss or land 16 of shell side wall 15 and threaded knob or nut 61. Thus, upon rotation of the threaded knob or nut 61 relative to its received threaded shank 60, the frictional spring 62 is deflected into more or less frictional engagement with the helmet shell 10 to retain the latter against rotation by any selected frictional resistance.

From the foregoing, it is seen that the present invention provides a headgear structure for supporting a welding helmet, and the like, which is extremely simple in construction, to effect substantial economies in manufacture and assembly, having no rivets or other metallic elements and being entirely of high dielectric material, being of a single integral piece to greatly simplify inventory of parts, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A headgear structure for supporting a welding helmet and comprising a headband for circumposition about a wearer's head, a bridge piece extending between spaced regions of said headband for extension across the wearer's head, a pair of elongate extensions located on opposite sides of said headband and each looped outwardly and upwardly with its terminal portion proximate to the adjacent region of said bridge piece, securing mens securing said terminal portions of said extensions to said bridge piece, and pivot mens extending through the outer portion of each looped extension for rotatively supporting a welding helmet, said headband and bridge piece and extensions being integrally fabricated of plastic, said securing means detachably securing said terminal portions to said bridge piece, said extensions being flexible to lie sustantially flat and coplanar with said headband and bridge piece in nonuse condition, said extensions each comprising an outstanding portion hingedly connected to a lower adjacent region of said headband, an upstanding portion hingedly connected to and upstanding from the outer extremity of said outstanding portion, and an inwardly extending portion hingedly connected to and extending inwardly from the upper extremity of said upstanding portion to said terminal portion.

2. A headgear structure according to claim 1, said securing means comprising releasably interfitting formations on said terminal portions and said adjacent regions of said bridge piece.

3. A headgear structure according to claim 1, said pivot means each comprising an inner fastener element extending nonrotatably through the associated one of said upstanding extension portions, an outer fastener element in threaded rotative engagement with said inner fastener element, and friction means interposed between said outer and inner fastener elements for selectively frictionally holding a welding helmet against rotation.

4. A headgear structure according to claim 3, in combination with selective releasably interfitting fastener means on and integral with the split end regions of said headband and bridge piece for adjustable connection thereof.

5. A headgear structure according to claim 1, said outstanding and upstanding portions being relatively thick to resist flexure, and the junctures of said outstanding and upstanding portions with each other and with said headband and inwardly extending portions being relatively thin to define hinged connections.

6. A headgear structure according to claim 1, said headband and bridge piece being split and flexible to lie substantially flat and coplanar with each other in nonuse condition.

7. A headgear structure according to claim 5 said securing means comprising releasably interfitting formations on said terminal portions and said adjacent regions of said bridge piece.

8. A headgear structure according to claim 5, said pivot means each comprising an inner fastener element extending nonrotatably through the associated one of said upstanding extension portions, an outer fastener element, in threaded rotative engagement with said inner fastener element, and friction means interposed between said outer and inner fastener elements for selectively frictionally holding a welding helmet against rotation.

* * * * *